(12) United States Patent
Hong (10) Patent No.: US 9,696,900 B2
(45) Date of Patent: Jul. 4, 2017

(54) SYSTEM AND METHOD FOR CREATION AND MANAGEMENT OF DIGITAL PHOTO BOOK

(71) Applicant: Jane P. Hong, Cary, NC (US)

(72) Inventor: Jane P. Hong, Cary, NC (US)

(73) Assignee: AtomKnows LLC, Cary, NC (US)

( * ) Notice: Subject to any disclaimer, the term of this patent is extended or adjusted under 35 U.S.C. 154(b) by 559 days.

(21) Appl. No.: 14/328,385

(22) Filed: Jul. 10, 2014

(65) Prior Publication Data

US 2016/0011736 A1 Jan. 14, 2016

(51) Int. Cl.
| | |
|---|---|
| *G06F 3/00* | (2006.01) |
| *G06F 3/0488* | (2013.01) |
| *G06F 3/0482* | (2013.01) |
| *G06F 17/24* | (2006.01) |
| *G06F 17/30* | (2006.01) |
| *H04L 29/06* | (2006.01) |

(52) U.S. Cl.
CPC .......... *G06F 3/0488* (2013.01); *G06F 3/0482* (2013.01); *G06F 17/248* (2013.01); *G06F 17/30244* (2013.01); *H04L 65/403* (2013.01)

(58) Field of Classification Search
None
See application file for complete search history.

(56) References Cited

U.S. PATENT DOCUMENTS 9,129,148 B1 * 9/2015 Li ................ G06K 9/00268
2012/0294514 A1 * 11/2012 Saunders .......... H04N 1/00196
382/159

* cited by examiner

*Primary Examiner* — Jeffrey A Gaffin
*Assistant Examiner* — Ayesha Huertas Torres (57) ABSTRACT

Disclosed is a digital photo book creation and management system based on a client-server technology, wherein the client device comprises a touch screen. The system comprises receiving one or more source (or virtual location) of one or more images, via a client user interface and downloading one or more images from the source into the server and client databases. Further, the metadata is extracted from the downloaded images or from the source of the images and stored within the server and client databases. Further, the downloaded images are rated using gesture recognition and the rating is saved as photo's metadata. The images are compiled into a digital photo book that can be edited from the client device based on a criteria performed on the photo's metadata. Further, the compiled digital photo book can be shared with users within the network and can be signed by the visiting users.

19 Claims, 9 Drawing Sheets

SYSTEM AND METHOD FOR CREATION AND MANAGEMENT OF DIGITAL PHOTO BOOK

CROSS-REFERENCE TO RELATED APPLICATION

This application claims benefit of priority of U.S. application 61/856,658 filed on Jul. 20, 2013 entitled "System and Method for Creation and Management Of Virtual Photo Book" owned by the assignee of the present application and herein incorporated by reference in its entirety.

BACKGROUND

The present invention relates to digital photo books and more particularly for creating and managing digital photo books that are adapted and optimized for touch enabled client devices with limited storage capability.

Common place photo book compilation software that exists in the art is ill-suited for today's mobile computing devices such as tablet and smart phones. Conventionally, in order to compile the digital photo book that can be sent to a print provider to create physical photo book, a user needs to download or copy the high resolution photos from a remote site or mobile device into his/her local hard drive to use a desktop photo book creation application, or upload these images to a web server for using a web based photo book creation application. After transmitting the photos to the photo book application, the photos along with other information associated with the photos are fed into the photo book compilation software to generate the photo book. The prior art software is not ideally suited for today's mobile computing devices for several reasons, such as, 1) limited local storage capacity that these modern devices come with, 2) sub-optimal user interaction input mechanism. Firstly, current mobile computing devices have limited storage; it is not ideal to download every high-resolution photo locally to use the software. Secondly, the standard interface for the conventional software is via peripheral input hardware like mouse and keyboard. In today's mobile computing devices, the touch screen is the de facto standard. Hence, it is not convenient to use conventional photo book software, which is ideal for conventional Personal Computing devices, and not on modern touch screen-enabled mobile computing devices. Due to these reasons, there is a need in the art for a photo book compilation software (or system) that is adapted and optimized for modern mobile touch enabled computing devices and that leverages hybrid storage of both mobile device local storage and cloud based storage.

SUMMARY

The present invention comprises of a system and method for creation of a digital photo book. The system spans a server comprising a server database and client applications adapted to communicate with the server through the network. The method comprises of receiving the virtual locations or the source(s) of images (or photos) that are to be compiled into a digital photo book through a client user interface. A virtual location can address a set of images (or photos) based on the local storage of the client device or the server accessible through the network. The low-resolution version of the specified images are downloaded and stored in a client database or a server database. To enable quick organization of large number of images, system prompts user to rate the imported images via swipe gesture. The system recognizes the swipe gestures and translates them into photo ratings, and the rating is saved in the photo's metadata and the system's database. Based on the photo's metadata including the rating data, the compilation module: 1) Selects photos with metadata matching a given criteria (for example, photos taken in the same month with 5 star rating) into photo sets, 2) Breaks the photo sets into subsets containing 1-4 photos where each subset represents a page 3) Selects and applies page templates that describes each page's photos geometric attributes (size, position and rotation). The user can further customize the photo book from the templates based on the photo book results, including the photo selection and the photo arrangement in the photo book pages. The compiled photo book metadata are saved. The system renders the saved photo book metadata as a set of page images for previewing and editing. The photo books can be compiled offline on the client device or on the server in case there is discrepancy of the compiled photo book metadata of the same book. The metadata distributed between client and server will then be merged into one final photo book as the server and the client devices are synchronized. As the last step, the system renders the print quality digital photo book pages by loading the book's metadata and the high-resolution version of each specified images.

Other objects and advantages of the embodiments herein will become apparent from the following detailed description taken in conjunction with the accompanying drawings.

FIGURES—REFERENCE NUMERALS

100—System network
101—Client device
102—Server

103—Cloud database
104—Social networking site
105—Image database
201—Client database
202—Server database
203—Receiver Module
204—Client-side Retrieval Module
205—Client-side Extraction Module
206—Client-side Compilation Module
207—Rating Module
208—Sharing Module
209—Signature Module
209a—Signature Interface
210—Server-side Retrieval Module
211—Server-side Extraction Module
212—Server-side Compilation Module
400a, 400b—Downloaded images in client device 1
400c, 400d—Downloaded images in client device 2
400e, 400f—Downloaded images in client device 3
401—Digital photo book compiled from the downloaded images
501—Digital photo book compiled in client device 1
502—Digital photo book compiled in client device 2
503—Merged digital photo books

DETAILED DESCRIPTION

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

Figure 1:
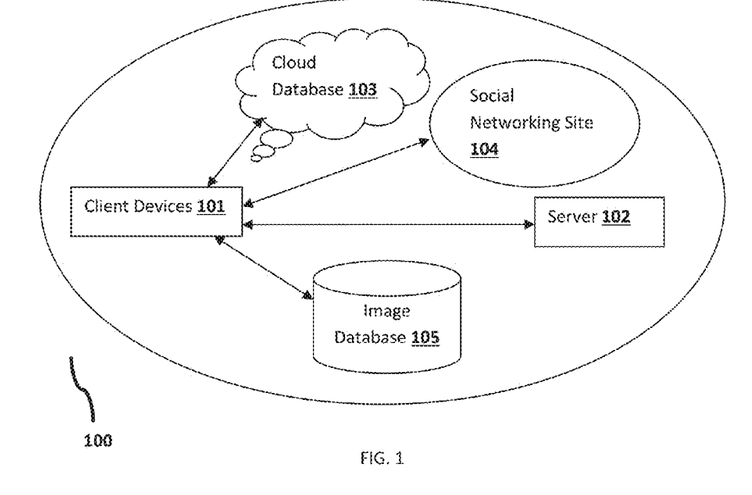
FIG. 1, according to an embodiment of the present invention, is an illustration depicting the overview of the system and the method used for creating and managing a digital photo book within a network.

The present invention comprises a computer-implemented system for creating and managing digital photo books wherein, the system is particularly adapted for client devices that have limited local storage capacity and the interaction is via a touch screen. Examples of client devices would be a tablet (an iPad or Android tablets), laptops, and smart phones, where the main user interaction is through the touch gesture performed on the device's screen. As depicted in FIG. 1, the system 100 spans a server 102, client applications installed on client devices 101 and other applications such as a cloud database, image database or the like disposed on various client devices 101. Each of the client applications are communicatively coupled to the server 102 through a network. As the server 102 and the client devices 101 are communicatively coupled to each other, the server and client databases are adapted to be in synchronization with one another. The client application comprises a client user interface for enabling a user to interact with the server 102 via the client device 101 in order to avail the services thereof. The present invention, for the sake of understanding, is divided into a plurality of modules.

Figure 2:
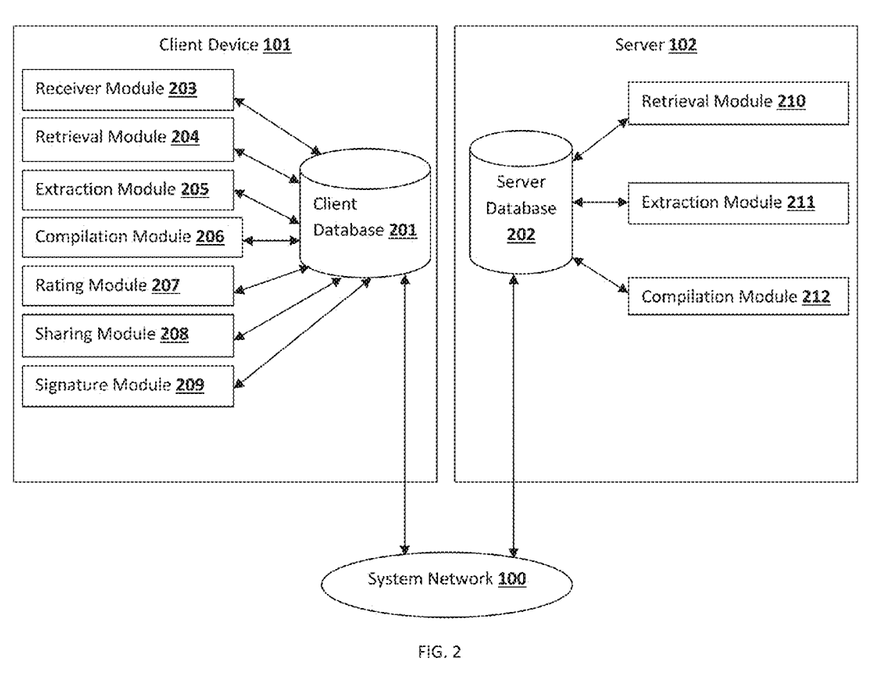
FIG. 2, according to an embodiment of the present invention, is an illustration of the block diagram of the system further depicting the components thereof.

Referring to FIG. 2, the system 100 comprises a receiver module 203 disposed within the client device 101 for receiving, via the client user interface, virtual locations or the source(s) of images (or photos), which are to be compiled into a digital photo book. The receiver module 203 is a user interface comprising an input field. In an embodiment, a virtual location can be addressing a folder or an album containing a set of photos at the local storage of the client device 101 or the server 102, or any other device accessible through the network 100, like, for example, from a Social networking site such as a Face book, Twitter or the like. In an embodiment, the receiver module 203 is communicatively coupled to retrieval modules 204 and 210, wherein one retrieval module 210 is disposed within the server 102, and the other retrieval module 204 is disposed within the client device 101. In an embodiment, the virtual locations are stored within client database 201 and later on, automatically stored on the server database 202 upon synchronization. The retrieval modules 204 and 210 are adapted to monitor, identify and download the images that are within the user specified virtual locations onto the server database 202.

Referring to FIG. 2, the Client device 101 and the Server 102 further comprises extraction modules 205 and 211, wherein one extraction module 211 is dedicated to the server side 102, while the other extraction module 205 is dedicated to the client side 101. The extraction modules 205 or 211 are adapted to extract the metadata of each of the images within the specified image source(s) and the extracted metadata is stored within the client database 201. In an embodiment, the retrieval modules 204 and 210 directly reads the photo's metadata if the photo source provides photo metadata retrieval Application Programming Interfaces (APIs). In another embodiment, if the photo source doesn't provide photo metadata retrieval APIs, the metadata extraction modules 205 and 211 connects to the photo source and retrieves the beginning portion of the photo JPEG files that contains EXIF metadata. This ensures that the metadata extraction can be completed without downloading the full images, which in turn reduces the network usage on the mobile device. In another embodiment, if the metadata extraction does not happen simultaneously with the image downloading activity at the server 102, the metadata extraction happens after the images are downloaded by the retrieval module 210. In an embodiment, on the client device 101, the metadata extraction is initiated as soon as the image source (s) are specified via the Receiver module 203. As the client and server databases 201 and 202 are synchronized, the server 102 and the client devices 101 have the same metadata stored there within. In an embodiment, the server 102 is configured to forward the metadata of new photos that the server has discovered while the client application is not functional, which ensures that the system always contains up-to-date photos in the monitored location.

As the photo quality may vary, user often needs to organize these photos by giving each photo a subjective quality rating. Referring to FIG. 2, the system 100 further comprises a rating module 207 disposed at the client device 101. A plurality of rating gesture entries that are categorized under gesture entries are stored within the client database 201 wherein, each rating gesture entry represents a rating gesture, which when performed on the client device 101 increases or decreases the rating of an image by a predetermined increment or decrement value. More particularly, the rating gestures comprise of two swipe gestures, such as an upward and a downward swipe gestures. The system 100 is configured such that when an upward swipe is performed by the user, the rating of an image goes up by a predetermined rating value, and, on the other hand, when the downward swipe is performed, the rating of the image goes down by the same predetermined rating value. In an embodiment, user can also first perform a tap gesture to select a set of photos at the client device, and then apply the upward or downward gestures. The rating of the multiple selected photos will be adjusted as if the user applied the same gesture on each of these photos. In one embodiment, when the client and server databases 201, 202 are synchronized, the plurality of rating gestures is copied to the server database 202. The quality rating of each photo is saved back to the photo's metadata that is also stored on the client and server database 201, 202. The photo's quality metadata can be used by the compilation module to dynamically create a photo book such that only photos meeting a given rating criteria will be included in the photo book.

Referring to FIG. 2, the system 100 further comprises compilation modules 206 and 212, wherein one compilation module 212 is disposed within the server 102, and the other compilation module 206 is disposed within the client device 101. Each of the compilation modules 206 and 212 are independent of each other and is adapted for compiling (or grouping) the received images (or photos) into a photo book pages based on the metadata of the downloaded images. The metadata of the downloaded images, for example, can be the date and time stamp during which an image is captured, the GPS location of the image, the device identifier on which the image is captured or the like. The compilation module performs the following activities when compiling the photo book:

1) Select photos with metadata matching a given criteria (for example, photos taken in the same month with 5 star rating) and generate an ordered photo sets {photo 1, photo 2, photo 3, photo 4, . . . . photo N}.

2) Breaks the photo sets into multiple smaller photo subsets where each subset is represented in association with a page {Page 1: photo 1}, {Page 2: photo 2, 3, 4}, {Page 3: photo 5, 6}.

3) Selects and applies page templates that describe photo geometric attributes (size, position and rotation) associated with each page.

In one embodiment, a plurality of predetermined photo book templates (or layouts) is stored in the client database 201 wherein, the template of the final photo book is specified by a user through the client device 101 thereof. In another embodiment, the photo book templates may be stored within the server database 202 and the server 102 can be configured to determine the template. The template may be determined randomly or based on the metadata of the images stored in the database 201, 202. An exemplary criterion for selecting the template would be the number of photos on a page of the photo book matching the number of photo slots available in a layout. Furthermore, the auto-generated photo book pages from the templates can be edited/customized via user gestures on the touch screen device 101, for example, user can drag the photo from the coordinate specified by the template layout to another location, and/or resize the photo frame on the page. Further, the user can save the changed layout as a new customized template layout in the client database 201 and sync with the server database 202 so that the template can be used during future photo book generation. The photo books compiled by the compilation modules 206 and 212 are stored within the respective databases 201 and 202 respectively, and as the server and client databases 201 and 202 are synchronized, the individual photo books are merged into one final photo book, which is accessible from the client device 101. In case a duplicate photo book entry exists, the synchronization is configured to compare the client device 101 entry and the server 102 entry's last update timestamp (stored in database) such that the newer version of the same entry overwrites the older version. Further, the system 100 is configured such that, the final photo book is editable from the client device 101 on the basis of the stored metadata.

Most of the photo sources provide multiple dimensions of the same image, and each differs in the resolution. Because of the limited network bandwidth and storage, the mobile touch screen device will only need to retrieve the lower resolution image (max dimension 1024 px by 1024 px) of the original image for rendering the preview quality of the photo book and allow the user to visually customize the photo book content. This lower resolution image will yield poor quality print so it cannot be used to render the print quality photo book pages for print. On the server side, the server will automatically retrieve the high resolution image (at least 2048 px by 2048 px) of a given image specified by the photo book's metadata, and then produce the print quality photo book pages for print.

Referring to FIG. 2, the system further comprises a sharing module 208 for sharing a final photo book with the guests. The sharing module 208, disposed at the client device 101 and the server 102, comprises a sharing interface accessible through the client user interface and the web rendering engine that renders photo book pages using the book metadata. The sharing interface comprises an email input field for providing the email addresses of the guests with whom the user wants to share his/her photo book. After valid email addresses are specified, emails, as enabled by the server 102, are dispatched to the guests inviting them to view the photo book by selecting a link to the web presentation of the photo book, which is within the email. The guest can view the digital photo book directly in a browser via the link. When the user clicks the link, the web rendering engine loads the photo book data from the emailed link and renders the book pages using the retrieved data. In an embodiment, the guest uses the client application (instead of the browser) to load the data and directly view the digital photo book from the guest's local device.

Referring to FIG. 2, the system 100 further comprises a signature module 209 for enabling guests to leave their digital signature via finger gestures on the photo book page indicating their visit. The gesture is digitized as an image and stored as the book page content, such that it can be presented to the photo book's future viewers. In an embodiment, the digitized gesture can be electronically transmitted to verify the book page content and the sender's identity.

Figure 3:
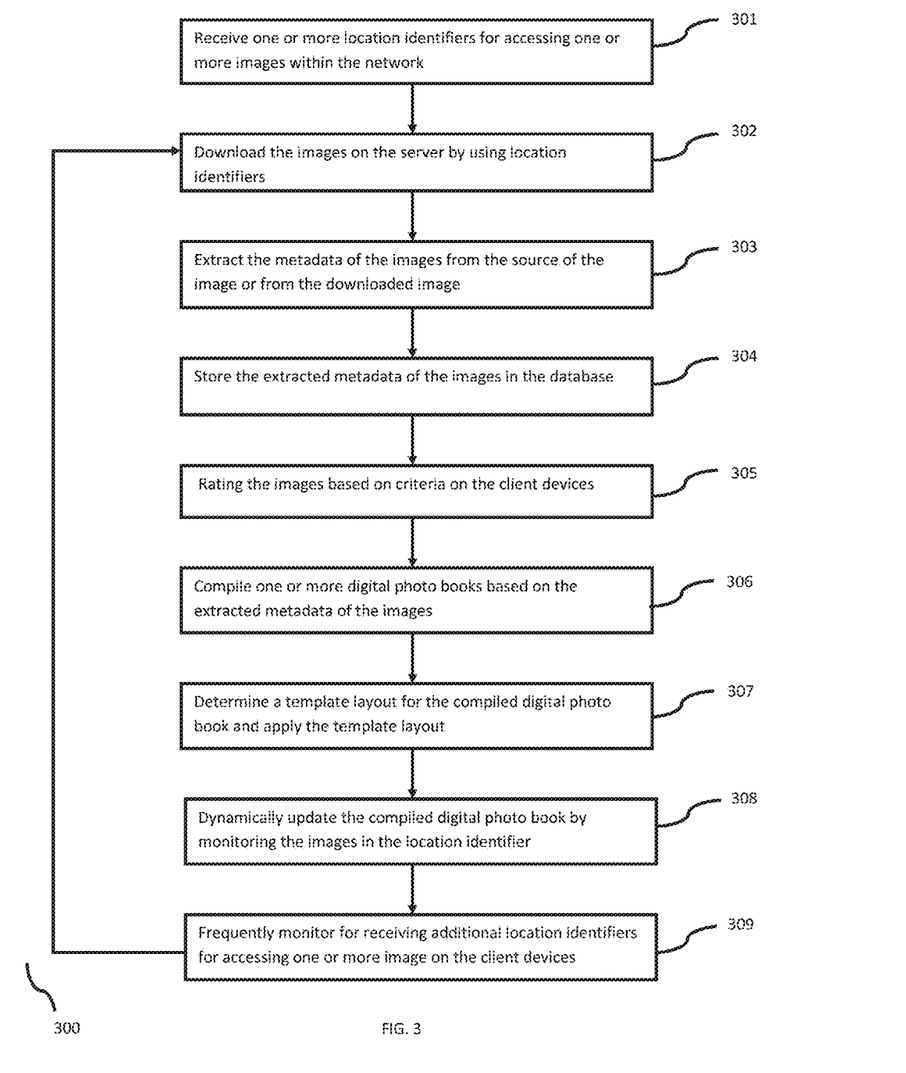
FIG. 3, according to an embodiment of the present invention, is an illustration of a flow-chart that explains the process of creating the digital photo book within the network.

Referring to FIG. 3, initially, at step 301, the client device 101 receives the location identifier for accessing one or more images, or virtual group of multiple images, for example a Face book album, within the network 100. In an embodiment, the receiver module 203, through the client user interface, is configured to receive the location identifier of the image or photos to be accessed. For example, the user may specify the location of one or more images that are stored in the social networking site such as a Face book. In the case where the user specifies a virtual group of images such as a Face book album, the retrieval module 203 will monitor all images belonging to this Face book album such that new photos added to this album will be automatically added to the photo book by the system. At step 302, the retrieval modules 204, 210 (disposed on the client device 101 and the server 102) communicatively coupled to the receiver module 203 downloads the metadata of the identified images onto the server database 202. For example, the images metadata that are identified on the Face book are downloaded and stored on the server database 202. At step 303, the metadata of the images that are identified using the location identifier or downloaded are extracted. In an embodiment, if the photo source doesn't provide photo metadata retrieval API, the extraction module 205, 211 extracts the metadata of the images either from the source of the image or from the downloaded image. For example, the extracted metadata of the images can contain the GPS location, a time stamp, or the camera device identifier from where the image is accessed. At step 304, the extracted metadata of the images are stored in the client database 201 or the server database 202. At step 305, the user can optionally rate the photo based on a subjective quality criteria. In an embodiment, the rating module 207 is configured to rate the images included in the digital photo book. At step 306, the images are compiled for creating one or more digital photo books based on the extracted metadata of the images. In an embodiment, the compilation modules 206, 212 are used to compile one or more digital photo books based on the extracted metadata of the images. For example, photo book A and photo book B are compiled on the client devices 1 and 2 respectively using the metadata of the downloaded images image 1, image 2, image 3, and image 4. Here, image 1 and image 2 metadata are compiled to create the photo book A. Image 3 and image 4 metadata are compiled to create the photo book B. At step 307, page templates are determined so that each page has a template that matches the number of photos available on that page. The selected template layout is applied for each page of the compiled digital photo book. Further, the compiled photo book metadata is saved to client database. The client application loads the compiled photo book data and renders the book pages in a graphical user interface so that user can customize it. Further, the user customized template layout is saved in the client and the server database, and can be used for future compiled digital photo books. At step 308, the photo sources are monitored for tracking the images accessed from the location identifier and dynamically determining the changes occurring to the photos/images in accordance with the location identifier. In an embodiment, the retrieval module 203 is configured to dynamically check if one or more photos that are imported from the location identifiers meet the photo book's dynamic generation criteria. In an embodiment, if these photos match with the photo book's compilation criteria the retrieving module 204 disposed within the client device 101 is configured to download one or more images based on the criteria. For example, when the user initially selected a Face book's album from the receiver module 203, the retrieval module 204 will dynamically monitor this album and identify new photos to be imported that match the compilation criteria. At step 309, the system 100 frequently monitors for receiving additional location identifiers from the users from where the images can be downloaded based on the criteria specified in the client device 101.

Figure 4:
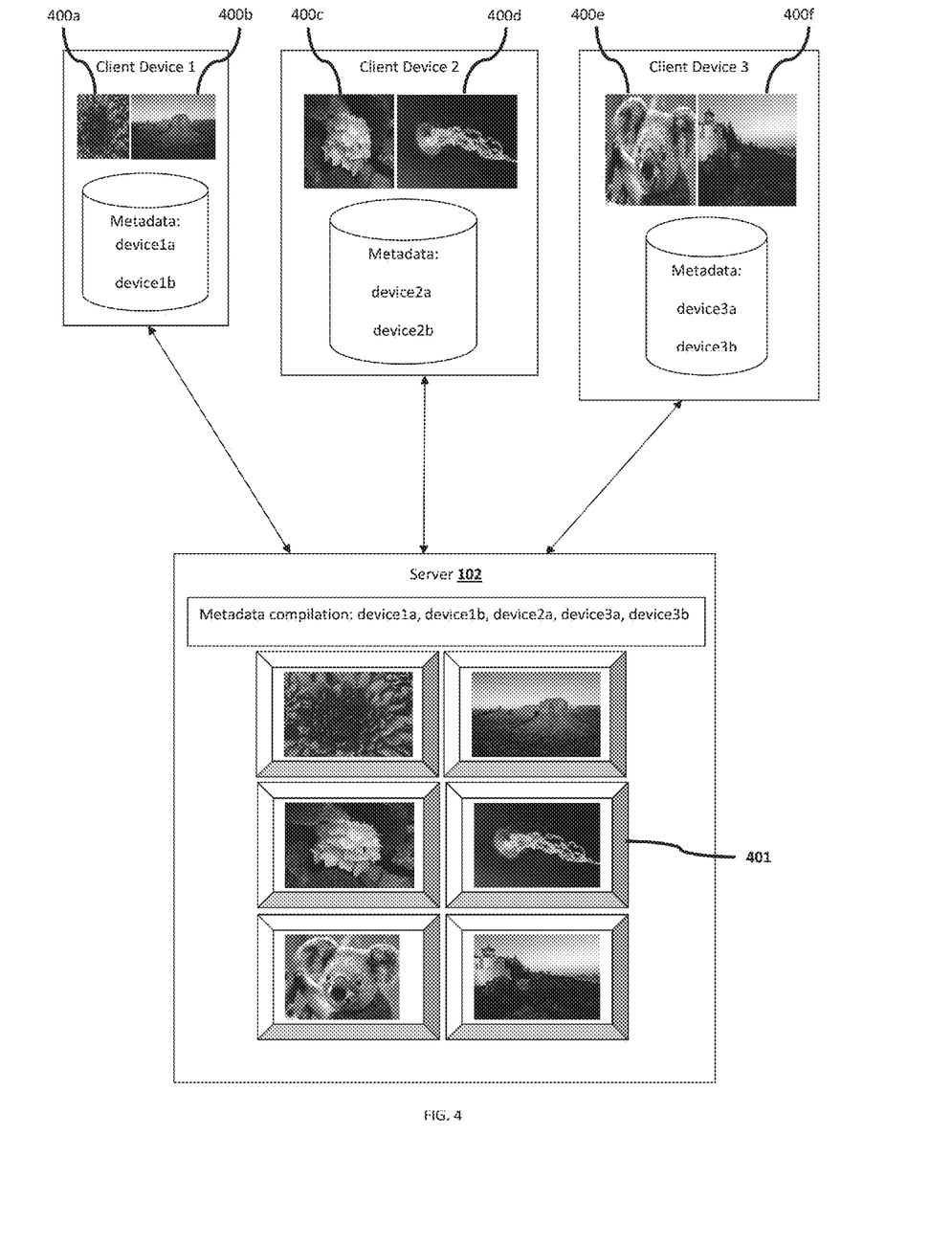
FIG. 4, according to an embodiment of the present invention, is an illustration of an exemplary way of creating the digital photo book within the network.

Referring to FIG. 4, the server 102 compiles a digital photo book 401 using the metadata of the images, wherein the images are accessed from various locations from the client devices 101. As depicted in the figure, client device 1 downloads the images 400a and 400b, client device 2 downloads the images 400c and 400d, client device 3 downloads the images 400e and 400f. Further, the server 102 extracts the metadata of the images (400a, 400b, 400c, and 400d) and compiles a digital photo book 401 using the photo book template layout.

Figure 5A:
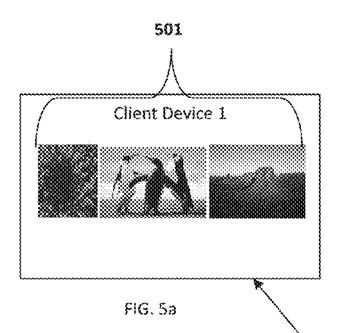
FIGS. 5a, 5b, and 5c, according to an embodiment of the present invention, are an illustration of an exemplary way of merging multiple versions of the same book page edited on different device one or more digital photo books within the network.
Figure 5B:
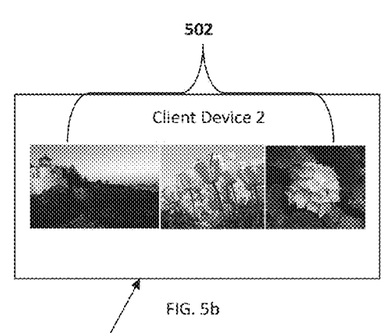
Figure 5C:
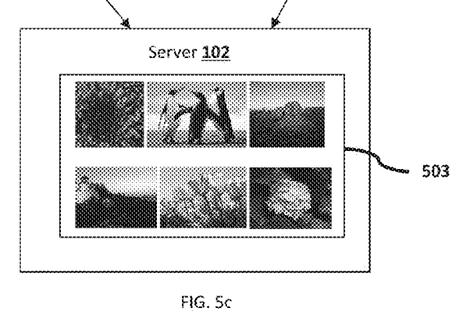

Referring to FIGS. 5a, 5b, and 5c, the server 102 merges one or more digital photo books that are compiled on one or more client devices 101. As depicted in the FIGS. 5a and 5b, the digital photo books 501, 502 are compiled on the client device 1, client device 2 respectively. Further, the system 100 merges the two digital photo books 501, 502 and stores the merged digital photo book 503 on the server 102. Further, during the client device 101 and the server 102 synchronization the merged digital photo book 503 is shared with the client device 1 and the client device 2.

Figure 6:
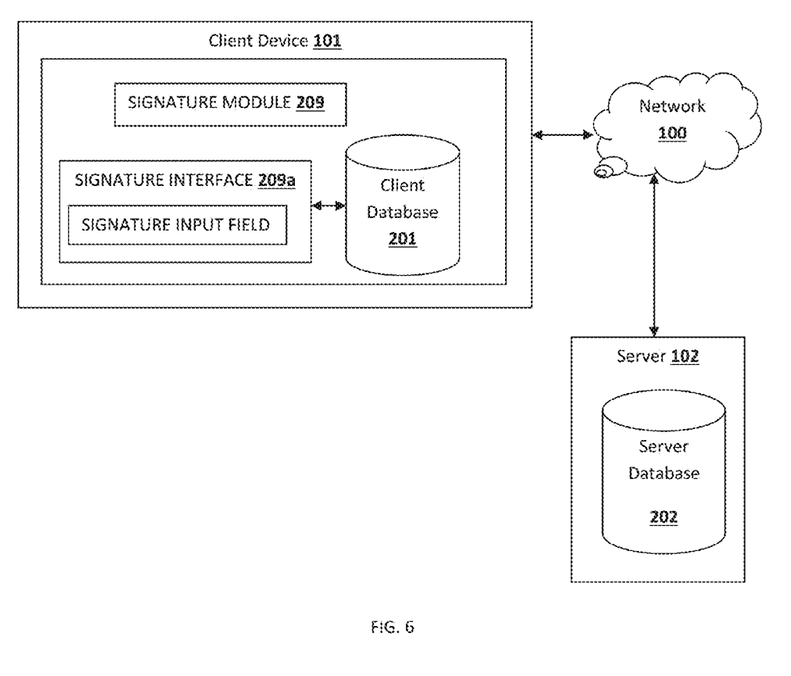
FIG. 6, according to an embodiment of the present invention, is an illustration of the block diagram depicting the components of a signature module and the relationship thereof with the client user interface.

Referring to FIG. 6, the signature module 209 comprises a signature interface 209a, which is associated with the client database 201, accessible through the client user interface. The signature interface 209a comprises a signature input field through which a guest needs to sign on the touch screen of his/her client device 101. Once signed, the signature is stored in the client database 201 as an image and is simultaneously displayed on the photo book, preferably on the first page thereof. In one embodiment, when the client and server databases 201 and 202 are synchronized, the signature images are copied to the server database 202. In one embodiment, the system 100 is configured to overlay each guest's signature over his/her photograph.

Figure 7A:
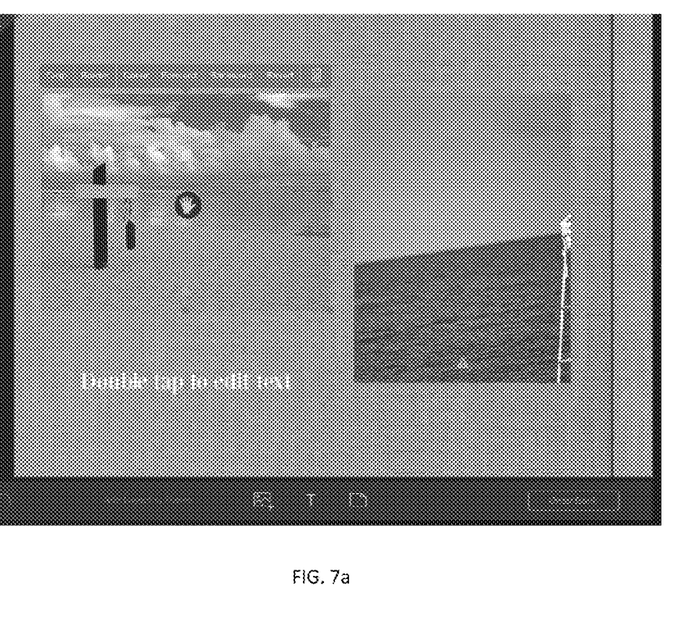
FIGS. 7a, 7b, and 7c, according to an embodiment of the present invention, is an illustration of an exemplary way of creating a template layout for the digital photo book and using the template layout for future digital photo book generation.
Figure 7B:
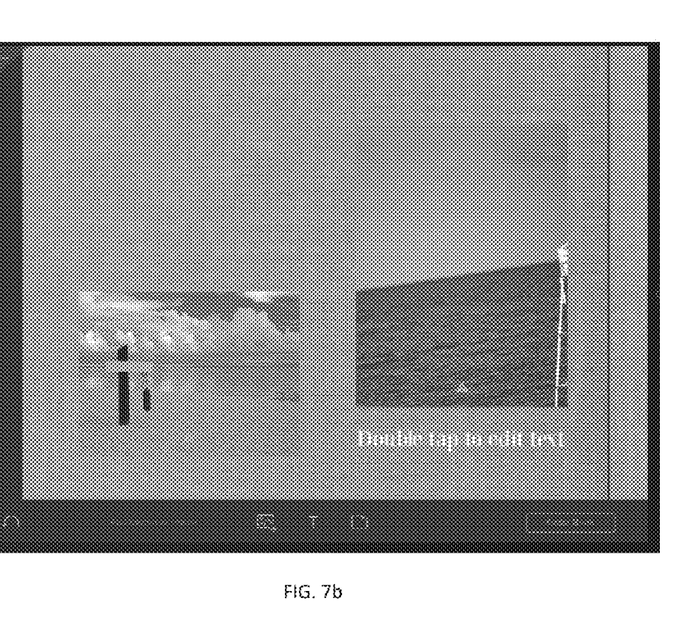
Figure 7C:
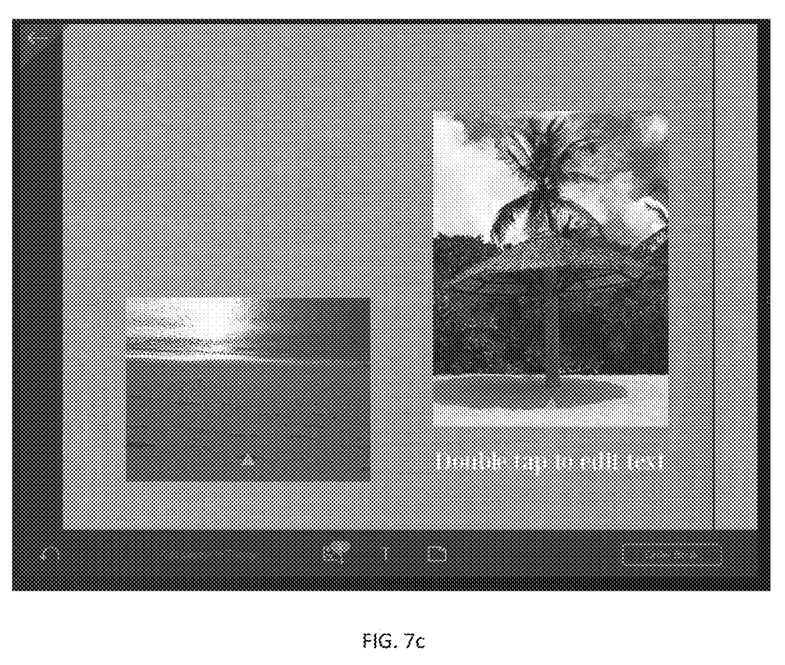

Referring to FIGS. 7a, 7b, and 7c, the auto-generated digital photo book includes images that can be edited in accordance with the location or frame of the image. Based on these edits, the template layout for the images are customized and saved in the client database 201 that can be used as a customized template during future photo book generation. As depicted in FIG. 7a, the original image frame on the left is modified and rendered as shown in FIG. 7b. A template layout that fits the images as displayed in FIG. 7b is customized and saved in the client database 201. Further, the template layout that is saved can be used to replace other images within the layout when future digital photo books are compiled as shown in FIG. 7c.

Figure 8:
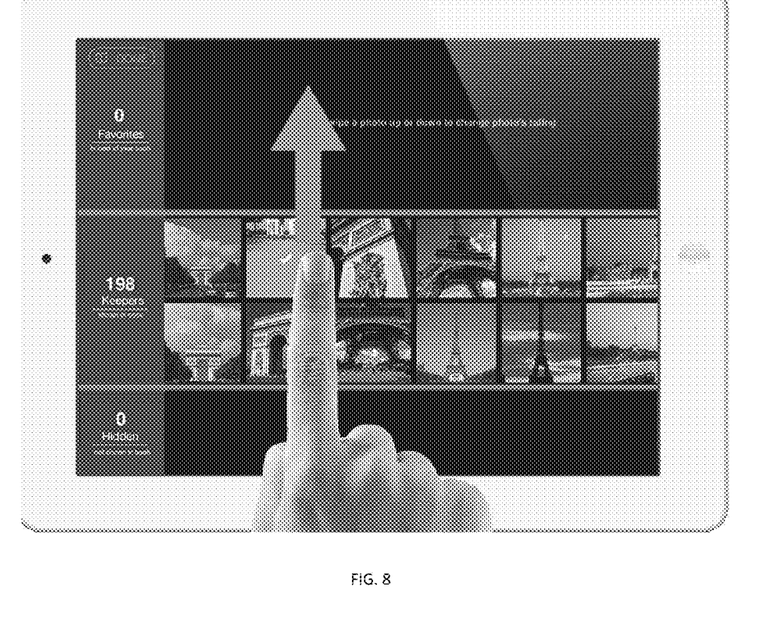
FIG. 8, according to an embodiment of the present invention, is an illustration of the swipe based gesture rating system.

Referring to FIG. 8, as the user selects a photo/image and swipes up to increase the photo/image quality, the rating of the photo/image is changed from normal to favorite. On the flip side, when the user swipes down the photo, the quality rating decreases from normal to poor value. The rating value determined for the photo/image is stored in the metadata of the photo/image.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

What is claimed is:

1. A method for creating and managing at least one digital photo book on an electronic device within a network, wherein said method comprises of:
    (a) receiving at least one location identifier associated with at least one image within said network;
    (b) downloading said at least one image based on said at least one location identifier;
    (c) extracting metadata of said at least one image;
    (d) storing said extracted metadata of said at least one image; and
    (e) rating said at least one image based on a gesture performed on said electronic device;

(f) compiling said at least one digital photo book based on said extracted metadata and photo quality rating created by processing user's gesture;

(g) determining a customized digital photo book template layout that is saved on said electronic device, wherein said customized digital photo book template can be accessed during future compilation of said at least one digital photo book; and (h) applying selected said customized digital photo book template layout for said at least one digital photo book that is compiled;

(i) dynamically updating said at least one digital photo book by monitoring the changes occurring in said at least one location identifier from where said at least one image is used in compilation of said at least one digital photo book.

2. The method as claimed in claim 1, wherein said electronic device is supported with a touch screen option.

3. The method as claimed in claim 1, wherein said at least one location identifier associated with said at least one image is specified by a user through a client interface.

4. The method as claimed in claim 3, wherein said at least one location identifier can refer to a location to download said at least one image from a social networking site, a client location, a server location, or any device source location within said network.

5. The method as claimed in claim 1, wherein compiling of said at least one digital photo book can be performed on one of: at least one client device, a plurality of client devices, a server device within said network based on said metadata.

6. The method as claimed in claim 5, wherein compiling further comprises of:

(a) merging a plurality of digital photo books compiled on said plurality of client devices based on said extracted metadata; when merge conflict occurs, it compares time stamp of change and use the newer copy to overwrite the older copy (b) synchronizing said plurality of digital photo books, after merging said plurality of digital photo books, between said plurality of client devices and said server device.

7. The method as claimed in claim 1, wherein managing said at least one digital photo book comprises of:

(c) sharing said at least one digital photo book with at least one user within said network;

(d) signing said at least one digital photo book by said at least one user who visits said at least one digital photo book; and (e) initiating an activity based on a gesture identified on said at least one digital photo book;

(f) printing said at least one digital photo book via integrated print service provider.

8. The method as claimed in claim 7, wherein ranking said at least one image is based on a pre-determined increment or decrement value stored in a database of said electronic device on which a gesture is performed.

9. The method as claimed in claim 8, wherein said gesture performed on said electronic device can be one of: an upward swipe, a downward swipe.

10. The system for creating and managing at least one digital photo book on an electronic device within a network, wherein said system comprises of a receiving module included in at least one client device, a metadata extraction module included in said at least one client device and a server, a compilation module included in said at least one client device and said server, a rating module included in said at least one client device, a sharing module included in said at least one client device, a signature module included in said at least one client device, and the system is configured to:

(a) receive at least one location identifier associated with at least one image within said network using the receiving module;

(b) download said at least one image based on said at least one location identifier;

(c) extract metadata of said at least one image using the metadata extraction module;

(d) store said extracted metadata of said at least one image;

(e) rate said at least one image based on a gesture performed using said rating module;

(f) compile said at least one digital photo book based on said extracted metadata using said compilation module;

(g) determine a customized digital photo book template layout that is saved on said electronic device, wherein said customized digital photo book template can be accessed during future compilation of said at least one digital photo book;

(h) apply selected said customized digital photo book template layout for said at least one digital photo book that is compiled;

(i) dynamically update said at least one digital photo book by monitoring the changes occurring in said at least one location identifier from where said at least one image is used in compilation of said at least one digital photo book.

11. The system as claimed in claim 9, wherein said electronic device is supported with a touch screen option.

12. The system as claimed in claim 9, wherein said at least one location identifier of said at least one image is specified by a user through a client interface.

13. The system as claimed in claim 9, wherein said at least one location identifier can refer to a location to download said at least one image from a social networking site, a client location, a server location, or any device source location within said network.

14. The system as claimed in claim 9, wherein compiling of said at least one digital photo book can be performed on one of: said at least one client device, a plurality of client devices, said server device within said network based on said metadata.

15. The system as claimed in claim 13, wherein compiling further comprises of:

(a) merging a plurality of digital photo books compiled on said plurality of client devices based on said extracted metadata; and (b) synchronizing said plurality of digital photo books, after merging said plurality of digital photo books, between said plurality of client devices and said server device.

16. The system as claimed in claim 9, wherein managing said at least one digital photo book comprises of:

(c) sharing said at least one digital photo book with at least one user within said network by using said sharing module;

(d) signing said at least one digital photo book by said at least one user who visits said at least one digital photo book by using said signature module; and (e) initiating an activity based on a gesture identified on said at least one digital photo book.

17. The system as claimed in claim 15, wherein ranking said at least one image is based on a pre-determined increment or decrement value stored in a database of said electronic device on which a gesture is performed.

18. The system as claimed in claim 16, wherein said gesture performed on said electronic device can be one of: an upward swipe, a downward swipe.

19. A computer program product comprising computer executable program code recorded on a computer readable non-transitory storage medium, said computer executable program code when executed, causing the actions including:
   (a) receiving at least one location identifier associated with at least one image within a network;
   (b) downloading said at least one image based on said at least one location identifier;
   (a) extracting metadata of said at least one image;
   (b) storing said extracted metadata of said at least one image;
   (c) rating said at least one image based on a gesture performed on said electronic device;
   (d) compiling said at least one digital photo book based on said extracted metadata and photo quality rating created by processing user's gesture;
   (e) determining a customized digital photo book template layout that is saved on said electronic device, wherein said customized digital photo book template can be accessed during future compilation of said at least one digital photo book; and
   (f) applying selected said customized digital photo book template layout for said at least one digital photo book that is compiled;
   (g) dynamically updating said at least one digital photo book by monitoring the changes occurring in said at least one location identifier from where said at least one image is used in compilation of said at least one digital photo book.

* * * * *